United States Patent Office 2,857,621
Patented Oct. 28, 1958

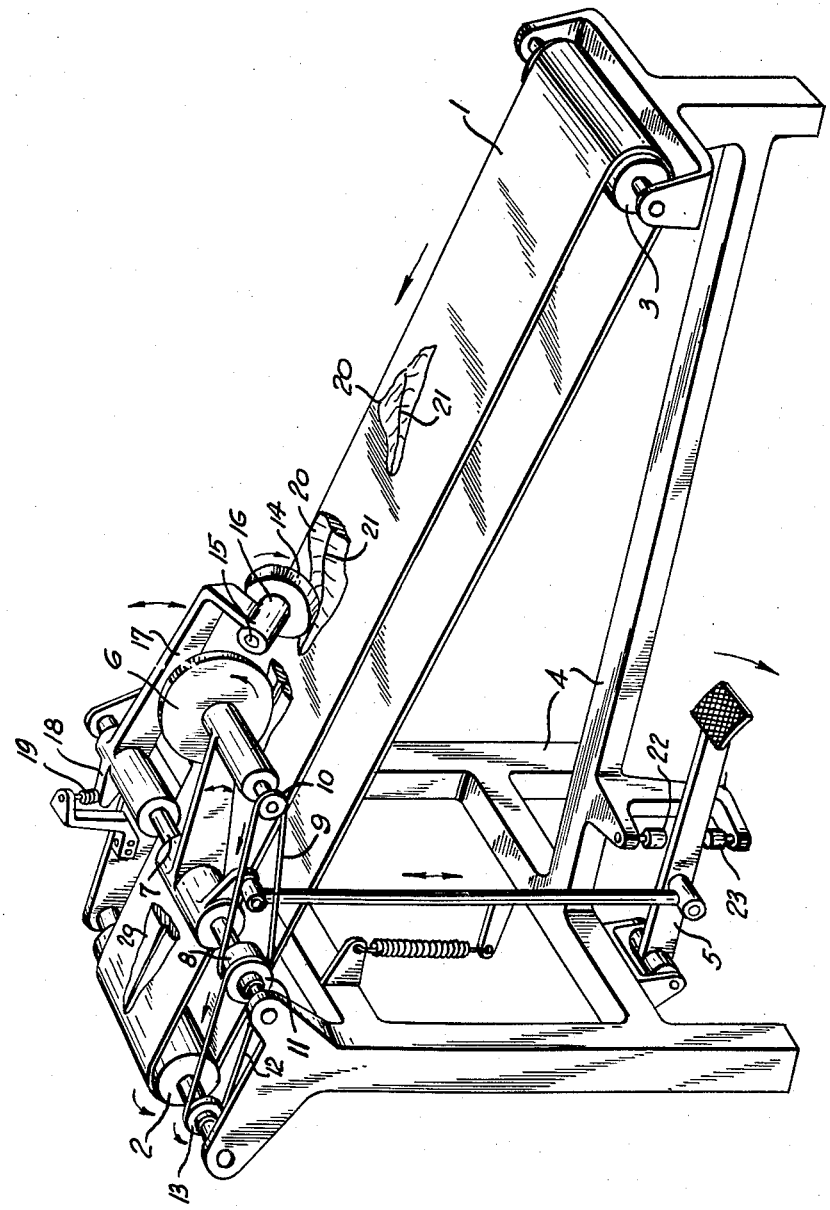

2,857,621

METHOD OF REMOVING PIN BONES FROM FISH

Karl Friedrich Schlichting, Lubeck, Holstein, Germany, assignor to Nordischer Maschinenbau Rud. Baader, Lubeck, Holstein, Germany, a firm Application December 23, 1954, Serial No. 477,148

Claims priority, application Norway November 18, 1954

1 Claim. (Cl. 17—45)

The invention relates to a method of removing the pin bones remaining after the cutting out of the back bone and consists in that the fillet pieces lying on the conveyor are fed accurately aligned to a tool for cutting out the pin bones with the aid of a guide element which engages the grooves produced by the removal of the backbones.

When filleting white or other fish suitable for producing two fillet halves, the objection arises that in the halves of the fish located laterally of the symmetry plane thereof, the small hooklike bones, the so-called pin bones, which originally adhered to the backbone, are still presented in the area of the belly cavity. The removal of these pin bones present difficulties because it is not easy to feed the fillet pieces to the tool for cutting out the pin bones in the correct position as the fillet pieces offer scarcely any possibilities of guiding in a certain direction. Consequently it has hitherto been necessary to feed the fillet pieces to the tool by hand or, in the case of mechanical guiding, to put up with inaccurate work of the tool and consequently with some of the pin bones remaining in the fillet pieces. An object of this invention is to eliminate these drawbacks.

It has now been found that it is quite possible to feed the fillet pieces to the tool for the removal of the pin bones accurately directed by mechanical means if the relatively sharp, deep groove produced by the removal of the backbone and from the base of which the pin bones extend, is used as point of engagement for a guiding element. For that purpose, the fillet pieces are placed on a conveyor belt in such a position that the tail end of the groove comes within the range of the guiding element so that this element as it feels its way along the groove directs the fillet piece in such a manner that it is pushed into such a position on the conveyor belt that it is fed to the tool for cutting out the pin bones accurately directed along the backbone groove.

An embodiment of the invention is illustrated by way of example in the accompanying drawing, the sole figure of which shows in perspective view an apparatus for carrying out the method forming the subject matter of the invention.

The apparatus consists of an endless conveyor belt 1, which is arranged on a stand 4 and runs over a driving pulley 2 and a guide pulley 3. Above the conveyor belt 1 a pair of circular knives 6 is arranged in such a manner that it can be swung into and out of its operative position with the aid of a pedal 5, which pair of knives receives its drive from a driving shaft 7 through the intermediary of a pulley 8, belt 9 and pulley 10. The driving pulley 2 is also driven from the driving shaft 7 through the intermediary of the pulley 11, belt 12 and pulley 13. Also above the conveyor belt 1 and in front of the pair of circular knives 6 a freely rotatable guide disk 14 is at an angle to the plane of the conveyor belt, the axle of this disk being mounted in a sleeve 16 which in turn is mounted in one arm 17 of a two-armed lever which is loosely mounted on the driving shaft 7 and the other arm of which is acted upon by a spring 19.

The apparatus operates in the following manner: The fish body is initially cut to remove the backbone, whereby, the body is cut into two fillet halves 20, as illustrated, for example, in Figure 12 of Patent No. 2,683,983, to R. Baader, belonging to the same assignee. The fillet halves 20 are placed on the conveyor belt 1 in such a position that the tail end is approximately in the middle of the belt 1 but in any case so that it comes within the range of the freely rotatable inclined guide disk 14. This disk as it runs on to the fillet piece 20 immediately engages the groove 21 produced by the removal of the backbone and positively moves along this groove or forces the fillet piece 20 into a position in which the groove 21 runs exactly on to the circular knives 6. As the guide disk 14 presses resiliently on to the fillet piece, on the one hand it is impossible for the fillet piece 20 to move out of the direction in which the groove 21 runs and on the other hand the fillet piece is neither damaged nor braked by the freely rotatable guide disk 14. As soon as the part of the fillet piece 20 containing the pin bones comes within the range of the pair of circular knives 6, when the groove 21 will be running exactly between the two knives of the pair of knives 6, the operator of the apparatus depresses the pedal 5 with the result that the pair of knives 6 is swung downwards on to the piece of fillet 20 and cuts out the pin bones. As soon as this has been done the pedal 5 is released and the pair of knives 6 again rises. To allow quick work and at the same time prevent too deep penetration of the pair of knives 6, the movement of the pedal 5 is very accurately adjustable between two set screws 22 and 23 both in upward and also in downward direction, so that, even if the fillet pieces follow each other in quick succession on the conveyor belt, the apparatus can operate in a perfect manner.

I claim:

The method of producing boneless fish fillets from fillets wherein the backbone has been removed and which have a groove formed by the removal of said backbone, said method comprising the steps of conveying said fillets bellyside upwards, guiding the fillets by engaging said groove and cutting out the pin bones from said fillets.

References Cited in the file of this patent

UNITED STATES PATENTS

| 2,552,984 | Leuschner | May 15, 1951 |
| 2,552,985 | Leuschner | May 15, 1951 |
| 2,577,686 | Hunt | Dec. 4, 1951 |
| 2,704,378 | Schlichting | Mar. 22, 1955 |